United States Patent [19]

Lee

[11] Patent Number: 5,505,479

[45] Date of Patent: Apr. 9, 1996

[54] ANTI-ROLL SYSTEM FOR VEHICLE

[75] Inventor: Unkoo Lee, Kyungki-do, Rep. of Korea

[73] Assignee: Hyundai Motor Co., Seoul, Rep. of Korea

[21] Appl. No.: 174,247

[22] Filed: Dec. 28, 1993

[30] Foreign Application Priority Data

Dec. 28, 1992 [KR] Rep. of Korea ............... 92-25850

[51] Int. Cl.⁶ ............................................. B60G 21/04
[52] U.S. Cl. ................................... 280/689; 267/229
[58] Field of Search .......................... 280/689, 772, 280/673, 675, 688, 669, 718, 719, 720, 694, 699; 267/229, 36.1

[56] References Cited

U.S. PATENT DOCUMENTS

| | | | |
|---|---|---|---|
| 2,179,477 | 11/1939 | Berendsen | 280/719 |
| 2,471,135 | 5/1949 | Wyeth | 280/689 |
| 2,637,568 | 5/1953 | Booth et al. | 280/673 |
| 3,831,966 | 8/1974 | Grosseau | 280/689 |
| 4,406,473 | 9/1983 | Sexton | 280/94 |
| 4,429,900 | 2/1984 | Feher | 280/689 |
| 4,781,364 | 11/1988 | Finn et al. | 280/689 |
| 4,807,902 | 2/1989 | Girodin | 280/688 |

FOREIGN PATENT DOCUMENTS

| | | | |
|---|---|---|---|
| 0407075 | 1/1991 | European Pat. Off. | 280/689 |
| 1008870 | 5/1952 | France | 280/699 |
| 2634696 | 2/1990 | France | 280/688 |
| 0176713 | 7/1988 | Japan | 280/689 |
| 3231019 | 10/1991 | Japan | 280/689 |
| 0491979 | 9/1938 | United Kingdom | 280/699 |
| 0618487 | 2/1949 | United Kingdom . | |

*Primary Examiner*—Brian L. Johnson
*Assistant Examiner*—Peter C. English
*Attorney, Agent, or Firm*—Birch, Stewart, Kolasch & Birch

[57] ABSTRACT

An anti-roll system for a vehicle includes a pair of front lower control arms positioned in transverse alignment between opposing front or rear wheels of the vehicle. Each control arm is pivotally connected to a subframe of the vehicle and further connected to wheel supporting knuckles, the pair of front lower control arms transforming an up-and-down wheel movement into rotational movement when viewed from a front of the vehicle. A pair of connecting arms, each connecting arm being a one-piece baton-shaped member connected at one end thereof to one of the lower control arms, respectively, are provided for transforming the rotational movement of the pair of front lower control arms into rectilinear turnaround movement in an axial direction. An elastic member is disposed in a longitudinal direction with respect to the vehicle body, wherein the rectilinear turnaround movement of the pair of connecting arms is restrained by a self-elastic force of the elastic member.

9 Claims, 5 Drawing Sheets

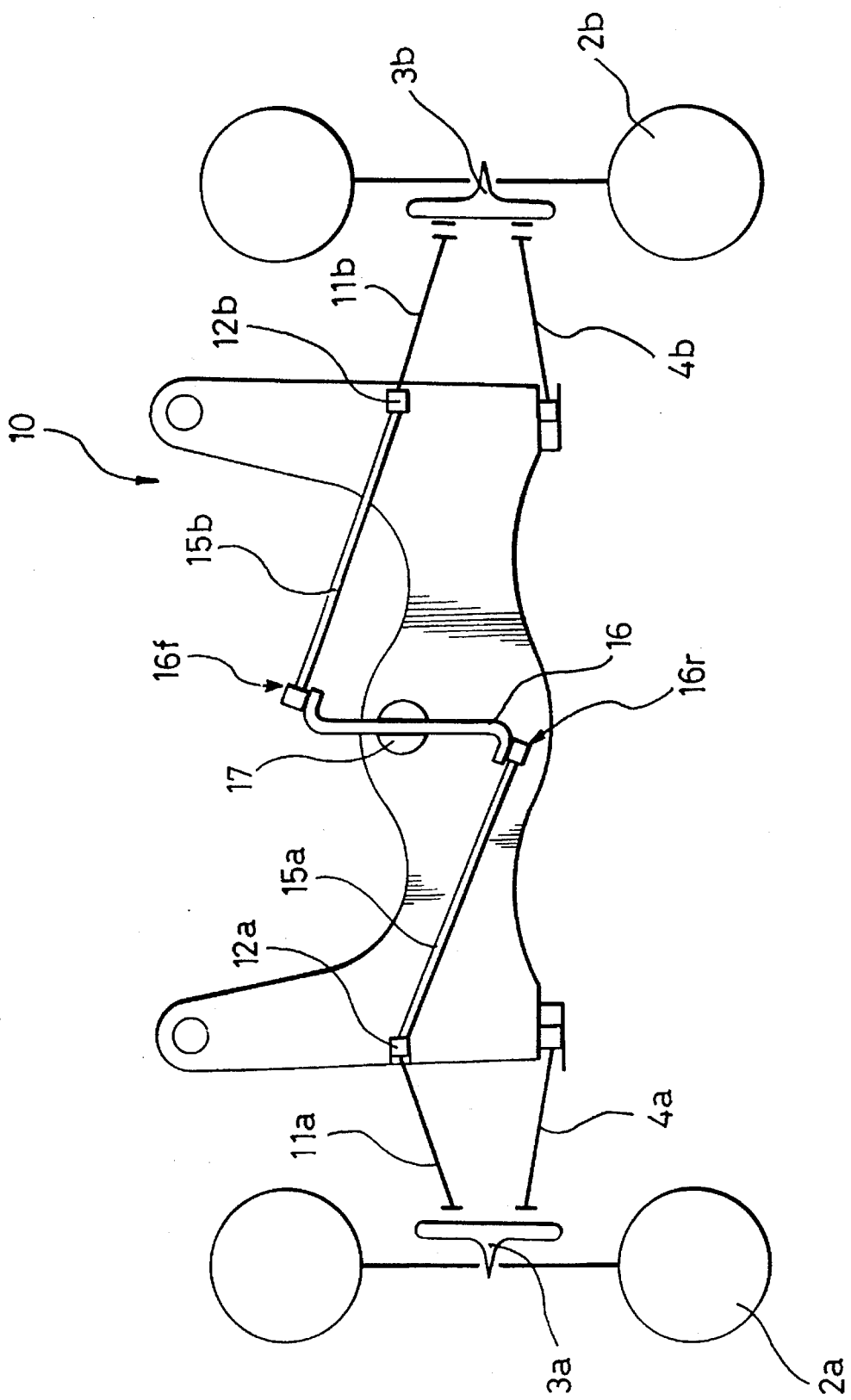

ANTI-ROLL SYSTEM FOR VEHICLE

BACKGROUND OF THE INVENTION

1. Field of the Invention

The present invention relates to an anti-roll system for a vehicle and, more particularly, to an anti-roll system for a vehicle that does not geometrically interfere with an existing suspension system and can change roll-controlling efficiency easily in accordance with roll stiffness.

2. Description of Related Art

In a steerable front wheel suspension, the suspension should be designed to absorb vibration or impact from the road surface as well as obtain running safety by maintaining an optimal position of a vehicle's straight ahead position and handling safety of a vehicle's turning position.

Stability of the vehicle is closely related to the vibration of the vehicle body during the vehicle's running, rolling, pitching, and yawing in addition to bounce. These vibrations should be absorbed to increase the stability and ride comfort of the vehicle.

In such vibrations, the rolling occurs at a predetermined point when the vehicle is in a turning situation, and this point is called a roll center. The variation rate of the roll center's height has an effect on the running safety and handling safety of the vehicle. Accordingly, to achieve running safety, it is more desirable to decrease the variation rate of the roll center's height.

There have been used well-known stabilizer bars as means for controlling roll generated naturally during the vehicle's running.

A stabilizer bar 70 is a kind of a torsion bar including a bent portion 71 having both ends bent to one side as shown in FIG. 5A.

If the stabilizer bar 70 is applied to a vehicle, it is disposed in the horizontal direction against the vehicle body, as shown in FIG. 5B. Its midpoint is fixed to the vehicle body or sub-frame. The end of the bent portion is fixed to a lower control arm 73 of a suspension system 72.

Accordingly, when the lower control arm 73 vibrates upward and downward by the up-and-down vibration of the wheel, the anti-roll system of the present invention may control rolling by minimizing the slant of the vehicle body by means of a self-elastic force of the stabilizer bar 70.

The conventional anti-roll system adopts a stabilizer bar having a small spring characteristic to attain good riding comfort but anti-roll function is not satisfactorily achieved because of centrifugal force encountered during the vehicle's turning.

On the contrary, if the stabilizer bar has a large spring characteristic, a geometrical interference of the suspension system is generated and riding comfort is deteriorated.

The stabilizer bar as mentioned above, has a limited spring characteristic, and the spring characteristic is not changeable until the stabilizer bar is replaced with another, which results in difficulties.

SUMMARY OF THE INVENTION

The present invention seeks to solve the above problems and provides an anti-roll system for a vehicle that does not geometrically interfere with an existing suspension system and can change roll-controlling efficiency easily in accordance with roll stiffness.

The present invention provides an anti-roll system for a vehicle comprising:

- lower control arms connected to knuckles supporting wheels in one direction for transforming an up-and-down movement of the wheels into rotational movement when viewed from the front of the vehicle;
- connecting arms for transforming a vehicle body-side rotational movement of the lower control arms into rectilinear turnaround movement in an axial direction; and
- an elastic member disposed in a longitudinal direction with respect to the vehicle body, wherein rectilinear turnaround movement of the connecting arms connected with both ends of the elastic member operates in the same direction, restraining the movement by self-elastic force.

In the anti-roll system, an elastic bush is inserted into a point connecting the lower control arms to the connecting arms to absorb minute vibration. The connecting arms are connected with the elastic member by an elastic bush to absorb minute vibration.

As another aspect of the present invention, an anti-roll system for a vehicle, comprises:

- lower control arms having hinge portions, horizontal portions projecting from the hinge portions toward a wheel side and vertical portions integrally projecting from the hinge portions being pivotally fixed to a sub-frame by an elastic bush;
- connecting arms having outside ends pivotally connected to the vertical portions of the lower control arms disposed in a transverse direction with respect to a vehicle body; and
- an elastic member having a mid-point fixed to a mount inserted rotatably to the sub-frame and rotatable left and right and front and rear ends connected to the connecting arms.

In this anti-roll system, the length of the horizontal portions is longer than the length of the vertical portions. In addition, the elastic member is formed to be a flat-plate spring member.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 2 is a plan view of the anti-roll system in accordance with the present invention;

DETAILED DESCRIPTION OF THE PREFERRED EMBODIMENTS

Figure 1:
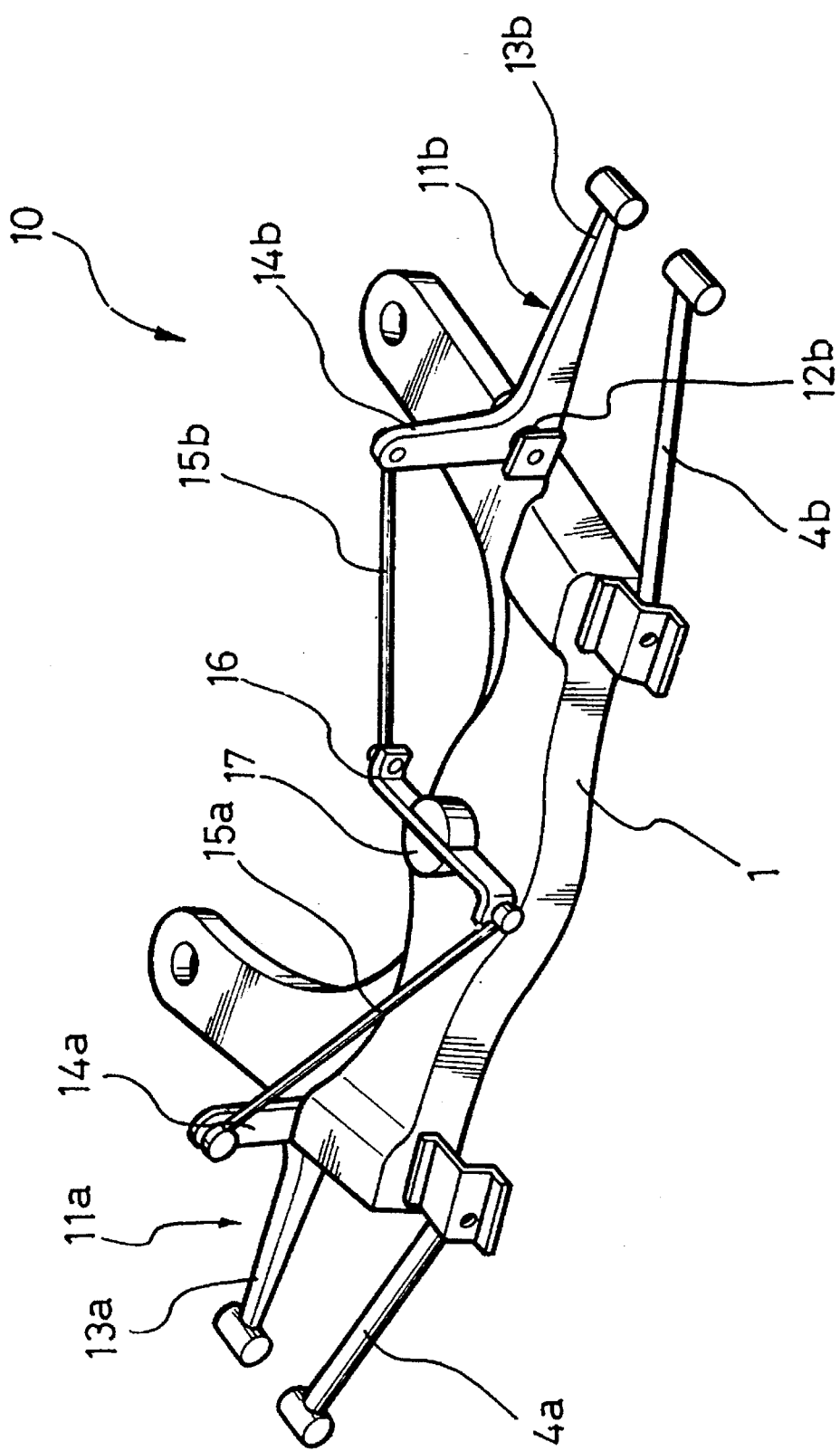
FIG. 1 is a perspective view of an anti-roll system in accordance with the present invention.

FIGS. 1 and 2 are respectively a perspective view and a plan view of an anti-roll system in accordance with the present invention. Reference numeral 1 designates a sub-frame.

The sub-frame 1 is mounted on the bottom portion of the vehicle body and is a fixed member connected with a suspension system, and the present invention forms an anti-roll system 10 operated by front and rear lower control arms 11a, 11b, and 4a, 4b connecting the sub-frame 1 to lower parts of knuckles 3a, 3b that are disposed horizontally with a predetermined space forward and rearward on the left and right sides of the sub-frame 1 supporting wheels 2a, 2b.

As a first preferred embodiment, the anti-roll system 10 is operated by the front lower control arms 11a, 11b among the front and rear lower control arms 11a, 11b, and 4a, 4b.

The front lower control arms 11a, 11b have hinge portions 12a, 12b, horizontal portions 13a, 13b integrally projecting from the hinge portions 12a, 12b toward the wheel side and vertical portions 14a, 14b integrally projecting from the hinge portions 12a, 12b upward, the hinge portions being pivotally fixed to the sub-frame 1 by an elastic bush.

Outer ends of the horizontal portions 13a, 13b of the lower control arms 11a, 11b are pivotally connected to the knuckles 3a, 3b. If the horizontal portions 13a, 13b move upward and downward pivoting about the hinge portions 12a, 12b by the upward and downward operation of the knuckle 3a, 3b according to the up-and-down movement of the wheels 2a, 2b, the vertical portions 14a, 14b move left and right.

Upper ends of the vertical portions 14a, 14b of the front lower control arms 11a, 11b are pivotally connected with outside ends of baton-shaped connecting arms 15a, 15b. Inside ends of the connecting arms 15a, 15b are respectively connected with front and rear ends of a plate-shaped elastic member 16 having a predetermined length disposed in a longitudinal direction with respect to the vehicle body on the sub-frame 1.

The mid-point of the elastic member 16 is fixed to a mount 17 (bearings may be used as a mount) rotatably disposed on the sub-frame, and may turn left and right when viewed from the top (FIG. 2).

As the elastic member 16, a plate spring or a member having an elastic force equivalent thereto, can be used, and the bent portion for connection to the inside ends 16r, 16f of the connecting arms 15a, 15b is bent to be round.

Simple hinge connecting means may be used to connect each component to one another, and, preferably, an elastic bush having a predetermined elasticity is inserted to absorb the minute vibration and have flexibility at the time of operation of each component.

The anti-roll system of this invention operates at the time of up-and-down movement of the lower control arms 11a, 11b, and, above all, its operation is now described when the wheels 2a, 2b bump up and/or down.

Figure 3A:
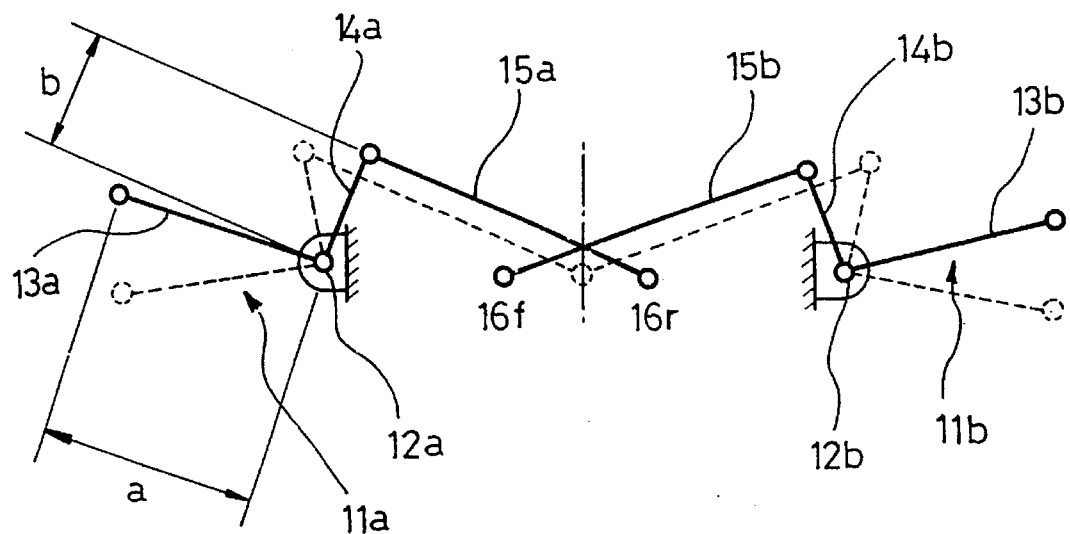
FIGS. 3A and 3B are respectively a front view and a plan view for showing the operating state during the simultaneous bump or rebound of both wheels.
Figure 3B:
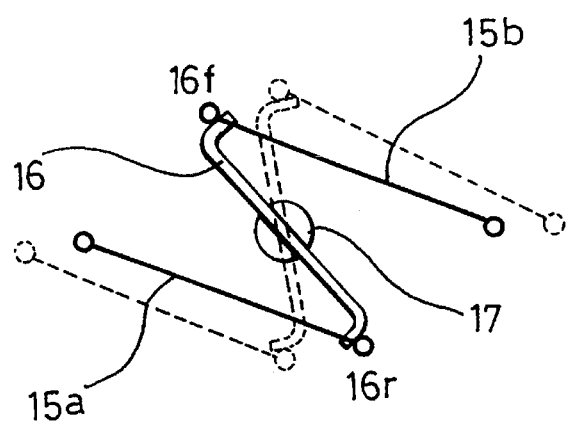

FIGS. 3A and 3B are respectively a front view and a plan view for showing the operating state during the simultaneous bump or rebound of both wheels. If both wheels 2a, 2b bump simultaneously, the horizontal portions 13a, 13b of the front lower control arms 11a, 11b rotate as shown in a solid line.

The vertical portions 14a, 14b of the lower control arms 11a, 11b then rotate toward the vehicle body, and push the connecting arms 15a, 15b connected with the plate-shaped elastic member 16 to the inside.

If the connecting arms 15a, 15b are pushed to the inside, the elastic member 16 receives force rotating counterclockwise simultaneously from the connecting arms 15a, 15b, and the mount 17 simply rotates counter-clockwise.

If both the wheels 2a, 2b rebound simultaneously, the front lower control arms 11a, 11b rotate downward as shown in a dotted line of FIGS. 3A, 3B, and pull the connecting arms 15a, 15b toward the outside of the vehicle body.

If the connecting arms 15a, 15b are pulled to the outside, the elastic member 16 receives force rotating clockwise from the connecting arms 15a, 15b, and the mount 17 simply rotates clockwise.

Figure 4A:
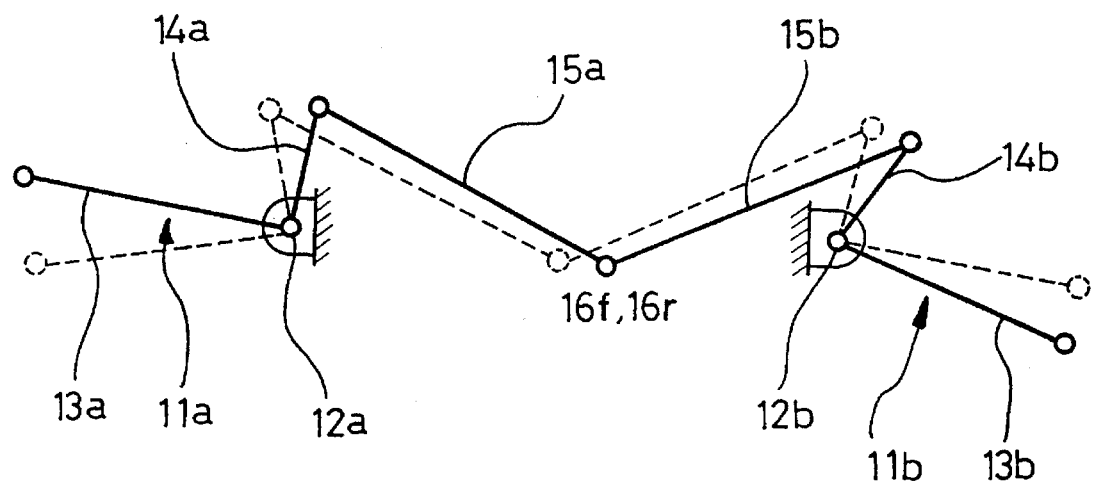
FIGS. 4A and 4B are respectively a front view and a plan view for showing the operating state when both wheels are opposite to each other.
Figure 4B:
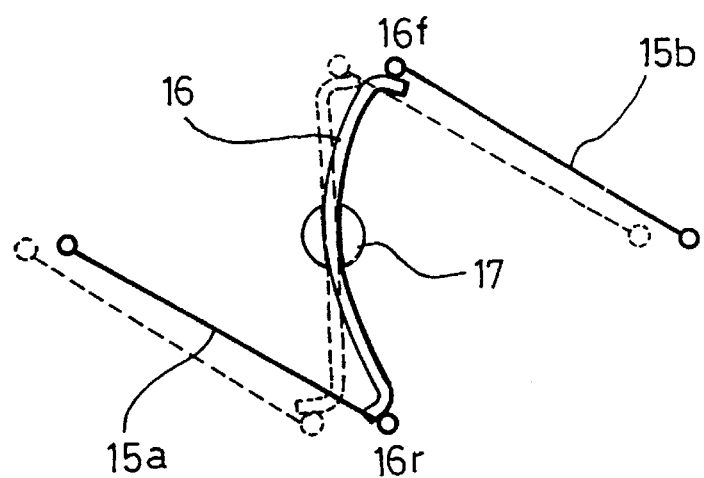
Figure 5A:
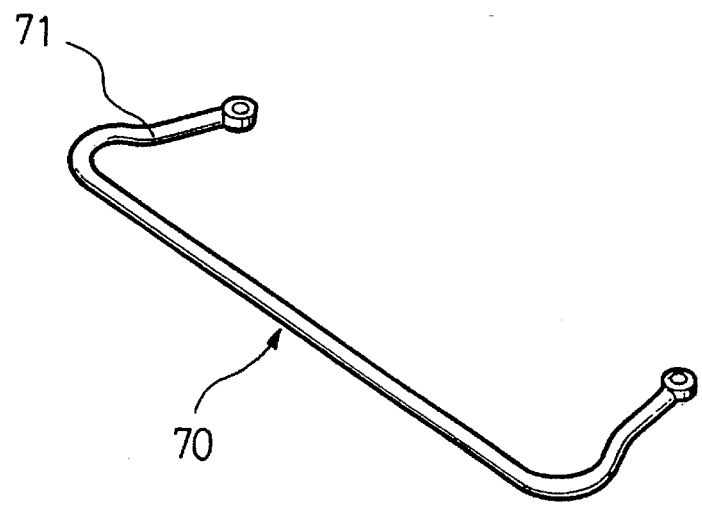
FIGS. 5A and 5B are perspective views of a stabilizer bar and a stabilizer bar mounted in a conventional manner.
Figure 5B:
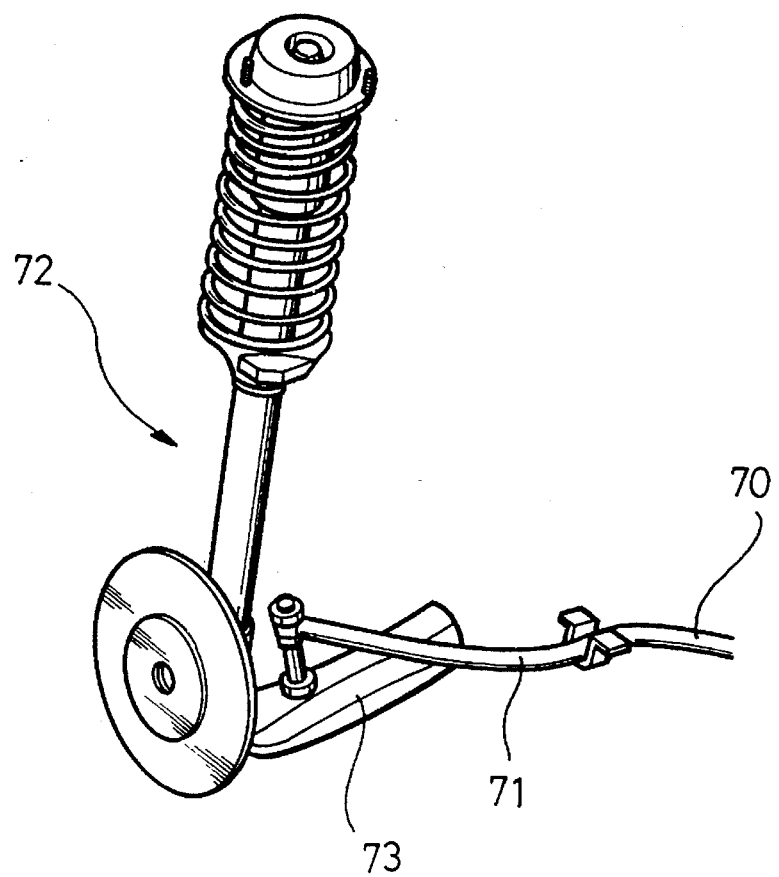

On the contrary, if one wheel 2a bumps and the other wheel 2b rebounds, the connecting arm 15a connected with the wheel 2a is pushed to the inside as shown in a solid line of FIGS. 4A and 4B, and the connecting arm 15b connected with the wheel 2b is pulled to the outside.

If the one side connecting arm 15a is pushed to the inside and the other side connecting arm 15b is pulled to the outside, the elastic member 16 connected thereto receives force in opposite directions. As shown in FIG. 4B, transformation of the plate 16 occurs and the roll of the vehicle body is restrained due to the elastic force of the plate 16.

In the above operation, if the length of the elastic member 16 that is protruded forward and rearward from the mount 17 is long, soft elasticity is generated according to leverage. The shorter the length of the elastic member 16, the harder elasticity becomes. Preferably, the protruded length is changed to be suitable for the characteristics of vehicle to which it is applied.

As shown in FIG. 3A, the length a of the horizontal portions 13a, 13b of the front lower control arms 11a, 11b and the length b of the vertical portions are preferably a>b, taking into account the length of the horizontal portions 13a, 13b having a large range of movement and the length of the elastic member 16 disposed in a confined area.

The anti-roll system of the present invention does not cause geometrical interference with the existing suspension system, since the elastic member 16 restraining the roll is disposed on the upper side of the sub-frame at a mid-point thereof. The roll is restrained by the vehicle-elastic force of the elastic member, and the anti-roll efficiency is easily changed just by replacing an elastic member having a suitable spring characteristic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An anti-roll system for a vehicle comprising:

a pair of front lower control arms positioned in transverse alignment between opposing front or rear wheels of said vehicle, each control arm being pivotally connected to a subframe of the vehicle and further connected to a wheel supporting knuckle, said pair of front lower control arms transforming an up-and-down wheel movement into rotational movement when viewed from a front of the vehicle;

a pair of connecting arms, each connecting arm being a one-piece baton-shaped member connected at one end thereof to one of said front lower control arms, respectively, for transforming the rotational movement of said pair of front lower control arms into rectilinear turn-around movement in an axial direction; and an elastic member disposed in a longitudinal direction with respect to the vehicle body and rotatably mounted to said subframe and operatively connected to said front lower control arms by said pair of connecting arms, wherein the rectilinear turnaround movement of said pair of connecting arms is restrained by a self-elastic force of said elastic member.

2. The anti-roll system according to claim 1, wherein an elastic bush is inserted at a connection of said pair of front lower control arms to said connecting arms to absorb minute vibrations of said front lower control arms.

3. The anti-roll system according to claim 1, wherein said pair of connecting arms are connected with said elastic member by an elastic bush to absorb minute vibrations of said connecting arms.

4. The anti-roll system according to claim 1, wherein said elastic member comprises a flat-plate spring member.

5. The anti-roll system according to claim 1, further comprising a pair of rear lower control arms, each arm having one end connected to said subframe and an opposing end connected to one of said knuckles.

6. An anti-roll system for a vehicle, comprising:

a pair of front lower control arms including hinge portions, horizontal portions projecting from the hinge portions toward a wheel side, and vertical portions integrally projecting from the hinge portions with each of the hinge portions being pivotally fixed to a sub-frame of said vehicle by an elastic bush;

a pair of connecting arms each having an outside end pivotally connected to the vertical portion of a corresponding one of said pair of front lower control arms and disposed in a transverse direction with respect to the vehicle; and an elastic member having a mid-point fixed to a mount rotatably attached to said sub-frame, opposing ends of said elastic member being connected to one of said pair of connecting arms, respectively.

7. The anti-roll system according to claim 6, wherein a length of the horizontal portions is longer than a length of the vertical portions.

8. The anti-roll system according to claim 6, wherein said elastic member comprises a flat-plate spring member.

9. The anti-roll system according to claim 6, further comprising a pair of rear lower control arms, each arm having one end connected to said subframe and an opposing end connected to a wheel supporting knuckle.

* * * * *